United States Patent
Iwashita et al.

(10) Patent No.: US 7,915,848 B2
(45) Date of Patent: Mar. 29, 2011

(54) SERVO CONTROL APPARATUS THAT PERFORMS DUAL-POSITION FEEDBACK CONTROL

(75) Inventors: Yasusuke Iwashita, Minamitsuru-gun (JP); Tadashi Okita, Minamitsuru-gun (JP); Yukio Toyozawa, Minamitsuru-gun (JP); Kazuomi Maeda, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/716,764

(22) Filed: Mar. 3, 2010

(65) Prior Publication Data

US 2010/0295495 A1    Nov. 25, 2010

(30) Foreign Application Priority Data

May 20, 2009   (JP) ................. 2009-122252

(51) Int. Cl.
G05B 19/19   (2006.01)
G05B 19/404   (2006.01)
G05D 3/12   (2006.01)

(52) U.S. Cl. ......... 318/560; 318/632; 318/638; 700/193

(58) Field of Classification Search .................. 318/560, 318/567, 569, 600, 625, 632, 638, 661; 700/13, 700/186, 188, 193
See application file for complete search history.

(56) References Cited

U.S. PATENT DOCUMENTS

| | | | |
|---|---|---|---|
| 4,535,277 A | | 8/1985 | Kurakake |
| 5,313,403 A | * | 5/1994 | Fujita et al. .................. 700/184 |
| 6,107,771 A | | 8/2000 | Maeda |

(Continued)

FOREIGN PATENT DOCUMENTS

| | | |
|---|---|---|
| JP | 58-181115 | 10/1983 |
| JP | 2-30522 | 7/1990 |
| JP | 10-268916 | 10/1998 |

(Continued)

OTHER PUBLICATIONS

Japanese Notice of Reasons for Rejection mailed Jun. 22, 2010 issued in Japanese Application No. 2009-122252 (including translation thereof).

*Primary Examiner* — Walter Benson
*Assistant Examiner* — Eduardo Colon-Santana
(74) *Attorney, Agent, or Firm* — Drinker Biddle & Reath LLP

(57) ABSTRACT

A servo control apparatus that performs dual-position feedback control and thereby achieves a reduction in position error according to the purpose of machining. The servo control apparatus includes: a first position detector for detecting the position of a motor; a second position detector for detecting the position of a driven load; a first position error calculator for calculating a first position error based on a position command and motor position feedback; a second position error calculator for calculating a second position error based on the position command and driven load position feedback; a third position error calculator for calculating a third position error to be used for position control, by adding to the first position error a difference taken between the first position error and the second position error and passed through a time constant circuit; a selector for selecting either the second position error or the third position error for output; and a learning controller for learning an output of the selector, and for outputting an amount of compensation to be applied to the third position error.

3 Claims, 6 Drawing Sheets

U.S. PATENT DOCUMENTS

| | | | |
|---|---|---|---|
| 6,677,722 B2 * | 1/2004 | Hamamura et al. | 318/632 |
| 6,889,115 B2 * | 5/2005 | Shiba et al. | 700/186 |
| 7,030,585 B2 | 4/2006 | Iwashita et al. | |
| 7,205,743 B2 | 4/2007 | Iwashita et al. | |
| 7,560,891 B2 | 7/2009 | Shibata et al. | |
| 2002/0151988 A1 | 10/2002 | Shiba et al. | |
| 2004/0183495 A1 | 9/2004 | Iwashita et al. | |
| 2006/0132078 A1 | 6/2006 | Iwashita et al. | |
| 2008/0218116 A1 * | 9/2008 | Maeda et al. | 318/571 |

FOREIGN PATENT DOCUMENTS

| | | |
|---|---|---|
| JP | 2001-222324 | 8/2001 |
| JP | 2002-032128 | 1/2002 |
| JP | 2002-297241 | 10/2002 |
| JP | 2004-213472 | 7/2004 |
| JP | 2004-234327 | 8/2004 |
| JP | 2006-172149 | 6/2006 |
| JP | 2007-219689 | 8/2007 |
| JP | 2007-316702 | 12/2007 |

\* cited by examiner

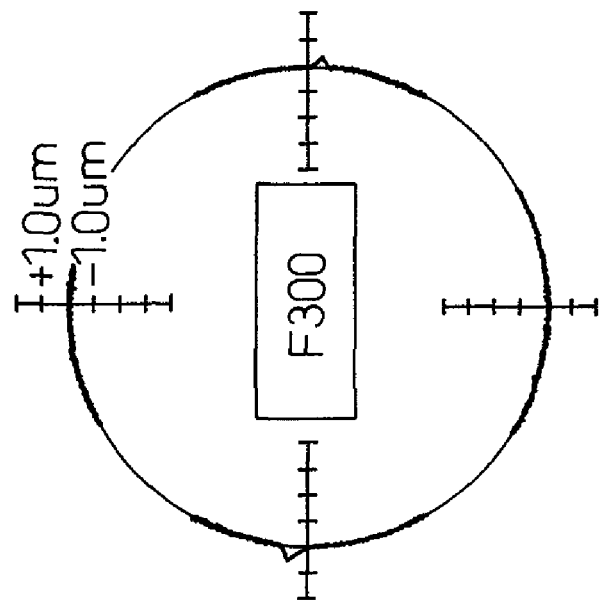
FIG. 5B  QUADRANT PROTRUSION WHEN LEARNING IS PERFORMED USING FULL-CLOSED POSITION ERROR
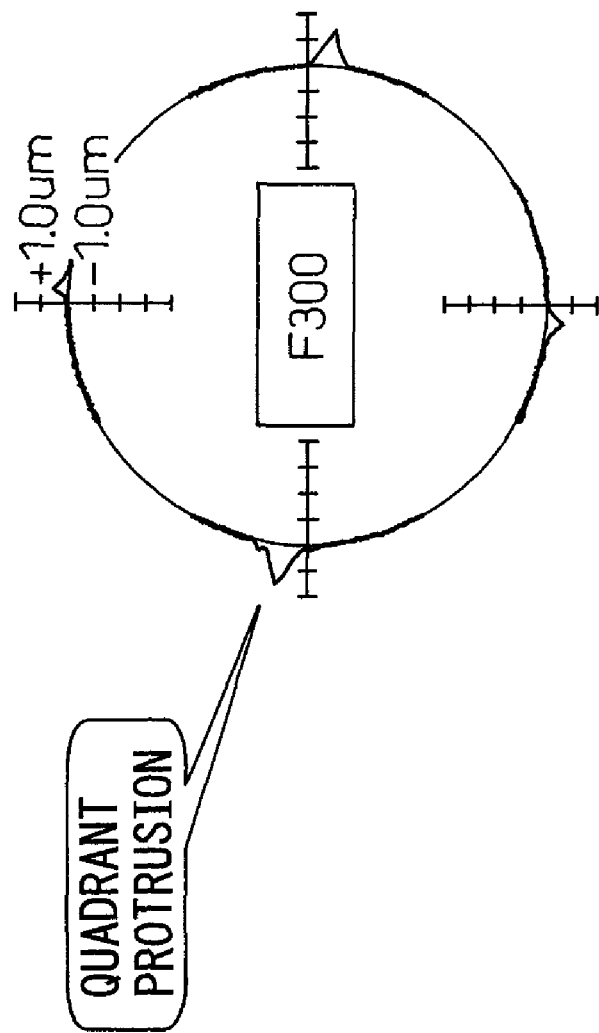
FIG. 5A  QUADRANT PROTRUSION WHEN LEARNING IS PERFORMED USING DUAL-POSITION ERROR MACHINING RESULT WHEN
LEARNING IS PERFORMED USING
FULL-CLOSED POSITION ERROR
(SPEED CONTROL GAIN:200%)

MACHINING RESULT WHEN
LEARNING IS PERFORMED
USING DUAL-POSITION ERROR
(SPEED CONTROL GAIN:400%)

※DUE TO LARGE CUTTING LOAD, MACHINING ACCURACY DEGRADES IF SPEED GAIN IS LOW

SERVO CONTROL APPARATUS THAT PERFORMS DUAL-POSITION FEEDBACK CONTROL

RELATED APPLICATION DATA

This application claims priority under 35 U.S.C. §119 and/or §365 to Japanese Application No. 2009-122252, filed May 20, 2009, the entire contents of which are incorporated herein by reference.

BACKGROUND OF THE INVENTION

1. Field of the Invention

The present invention relates to a servo control apparatus that performs dual-position feedback control based on the position of a servo motor and the position of a driven load.

2. Description of the Related Art

Servo control for controlling a servo motor that drives a load is classified as semi-closed-loop control, full-closed-loop control, or hybrid control, according to which position information is fed back for the control. In semi-closed-loop control, feedback control is performed by detecting the position of the servo motor. In full-closed-loop control, feedback control is performed by detecting the position of the driven load. However, in hybrid control, feedback control is performed by detecting both the position of the servo motor and the position of the driven load, i.e., dual-position feedback control is performed (for example, refer to patent documents 1 and 2 cited below).

In servo control, when performing a machining operation which is repeated in a periodic fashion, learning control is widely used in order to achieve highly accurate machining by progressively reducing position error close to 0. In this learning control, the position error is compensated by adding the previously applied amount of compensation to the detected position error, and a position control loop is formed based on the thus compensated position error (for example, refer to patent document 3 cited below).

Specifically, patent document 4 cited below discloses an invention in which compensation data for reducing quadrant protrusion is created through learning control and stored, the stored data is then used to perform compensation for the prevention of quadrant protrusion. A quadrant protrusion refers to a protrusion that occurs when the moving direction of the feed shaft is reversed as the machining position changes from one quadrant to another.

When performing the learning control and the quadrant protrusion compensation according to the invention disclosed in patent document 4, if the learning control is performed using the position error of the servo motor in accordance with the semi-closed-loop control, the quadrant protrusion on the servo motor side can be reduced by reducing the position error of the servo motor, but there is a problem in that the quadrant protrusion on the driven load side, i.e., the machine side, cannot be reduced, because the compensation value for reducing the position error on the machine side cannot be obtained.

Conversely, if the learning control is performed using the position error on the machine side in accordance with the full-closed-loop control, the compensation value for reducing the position error on the machine side can be obtained. However, if the position loop gain or speed loop gain is set to a high value, the learning control may not converge due to such factors as the distortion or backlash between the servo motor and the machine, resulting in the problem that the gain cannot be increased. In the case of a machining operation in which the cutting reaction force is small, there will be no problem if the gain is reduced, but in the case of a machining operation that involves a large cutting reaction force, if the gain is reduced, machining accuracy may degrade due to the cutting reaction force.

Patent Document 1: Japanese Examined Patent Publication No. H02-30522

Patent Document 2: Japanese Unexamined Patent Publication No. 2002-297241

Patent Document 3: Japanese Unexamined Patent Publication No. 2006-172149

Patent Document 4: Japanese Unexamined Patent Publication No. 2004-234327

SUMMARY OF THE INVENTION

In view of the above problems, it is an object of the present invention to provide a servo control apparatus that performs dual-position feedback control and thereby achieves a reduction in position error according to the purpose of machining.

To achieve the above object, according to the present invention, there is provided a servo control apparatus that performs dual-position feedback control, comprising: a first position detector for detecting the position of a servo motor; a second position detector for detecting the position of a load being driven by the servo motor; a first position error calculator for calculating a first position error based on a position command for the driven load and on position feedback from the first position detector; a second position error calculator for calculating a second position error based on the position command for the driven load and on position feedback from the second position detector; a third position error calculator for calculating a third position error to be used for position control, by adding to the first position error a difference taken between the first position error and the second position error and passed through a time constant circuit; a selector for selecting either the second position error or the third position error for output; and a learning controller for learning an amount of compensation necessary to bring the second position error or the third position error, whichever is output from the selector, close to zero, and for outputting the learned amount of compensation as an amount of compensation to be applied to the third position error.

In one preferred mode, the selector makes the selection, based on either a parameter or an external signal or on the position of the driven load.

In another preferred mode of the servo control apparatus, when calculating the first position error, the first position error is compensated by applying an amount of compensation proportional to the speed of the servo motor to compensate for a delay in detection by the first position detector, and when calculating the second position error, the second position error is compensated by applying an amount of compensation proportional to the speed of the driven load to compensate for a delay in detection by the second position detector.

According to the servo control apparatus of the present invention, when performing control where stability is an important consideration, the learning control is performed by taking the third position error as input, thereby making it possible to achieve stable control while maintaining a certain degree of accuracy, and when performing control where accuracy is an important consideration, the learning control is performed by taking the second position error as input, thereby making it possible to achieve highly accurate control.

BRIEF DESCRIPTION OF THE DRAWINGS

The features and advantages of the present invention will be apparent from the following description with reference to the accompanying drawings, in which:

FIGS. 5A and 5B are diagrams showing an example 1 illustrating the effect of the invention by way of example.

DETAILED DESCRIPTION

Figure 1:
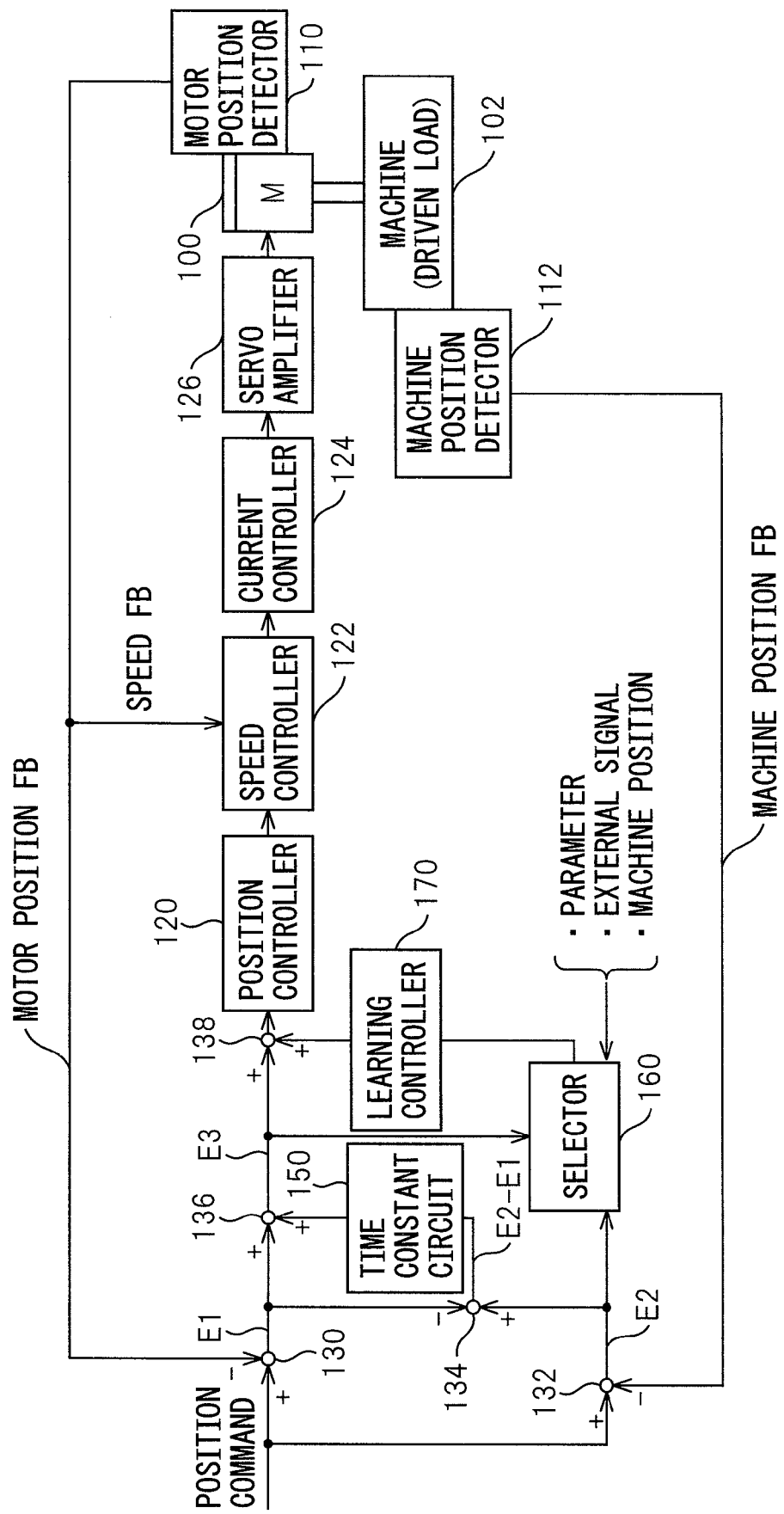
FIG. 1 is a block diagram showing one embodiment of a servo control apparatus according to the present invention.

The embodiments of the present invention will be described below with reference to the accompanying drawings. FIG. 1 is a block diagram showing one embodiment of a servo control apparatus according to the present invention. In FIG. 1, a servo motor 100 drives a machine 102 as a driven load. A motor position detector 110 detects the position of the motor 100, and outputs the detected value as a motor position feedback (FB), and, a machine position detector 112 detects the position of the machine 102, and outputs the detected value as a machine position feedback.

Based on a position error supplied as will be described later, a position controller 120 computes a speed command using a proportional-integral (PI) control or the like, and outputs the speed command. A speed controller 122 obtains speed error by comparing the speed command with the speed feedback obtained by differentiating the motor position feedback, computes a current command using a proportional-integral (PI) control or the like, and outputs the current command. A current controller 124 computes an amplifier driving command based on the current command, and outputs the amplifier driving command. A servo amplifier 126 amplifies the amplifier driving command and supplies it to the motor 100.

Figure 2:
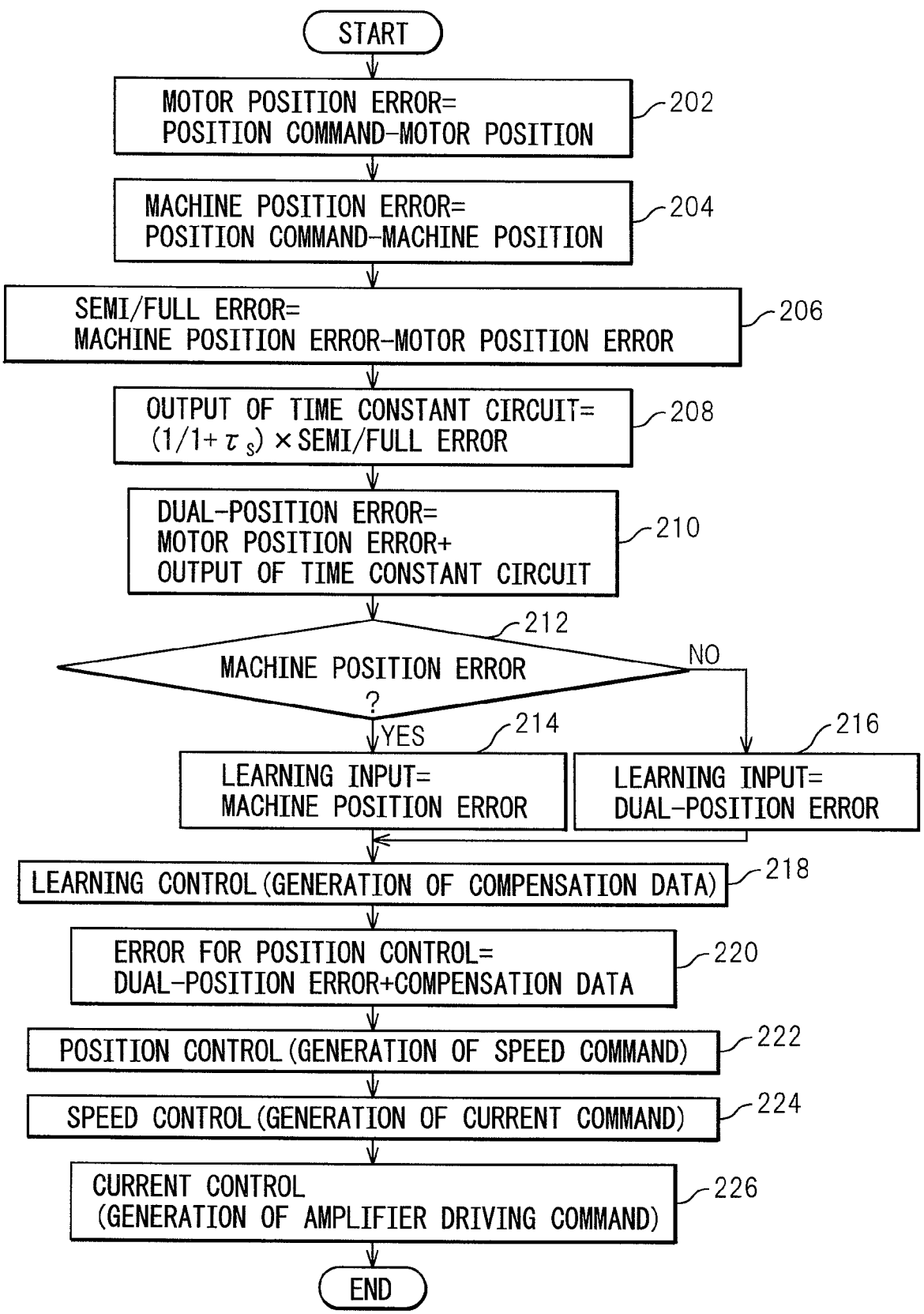
FIG. 2 is a flowchart illustrating the operation of the servo control apparatus shown in FIG. 1.

The present embodiment includes adders 130, 132, 134, 136, and 138, a time constant circuit 150, a selector 160, and a learning controller 170 in order to obtain the position error to be supplied to the position controller 120. These component elements will be described with reference to the flowchart of FIG. 2 in conjunction with the block diagram of FIG. 1.

First, the adder 130 calculates a motor position error E1 as a first position error by subtracting the motor position feedback from a position command supplied from a higher-order control apparatus (step 202). At the same time, the adder 132 calculates a machine position error E2 as a second position error by subtracting the machine position feedback from the position command (step 204).

Next, the adder 134 calculates a semi/full error "E2−E1" by subtracting the motor position error E1 from the machine position error E2 (step 206), and supplies it to the time constant circuit 150. Acting as a first-order lag element with a time constant τ, the time constant circuit 150 processes the semi/full error "E2−E1" accordingly and outputs the result (step 208). Next, the adder 136 calculates a dual-position error E3 as a third position error by adding the output of the time constant circuit 150 to the motor position error E1 (step 210).

Next, based on one of a parameter, an external signal, the position of the machine 102, etc., the selector 160 selects either the machine position error E2 or the dual-position error E3 for supply to the learning controller 170 (steps 212, 214, and 216). The learning controller 170 creates, through learning, compensation data for bringing the machine position error E2 or the dual-position error E3, whichever is output from the selector 160, close to zero (step 218).

Figure 4:
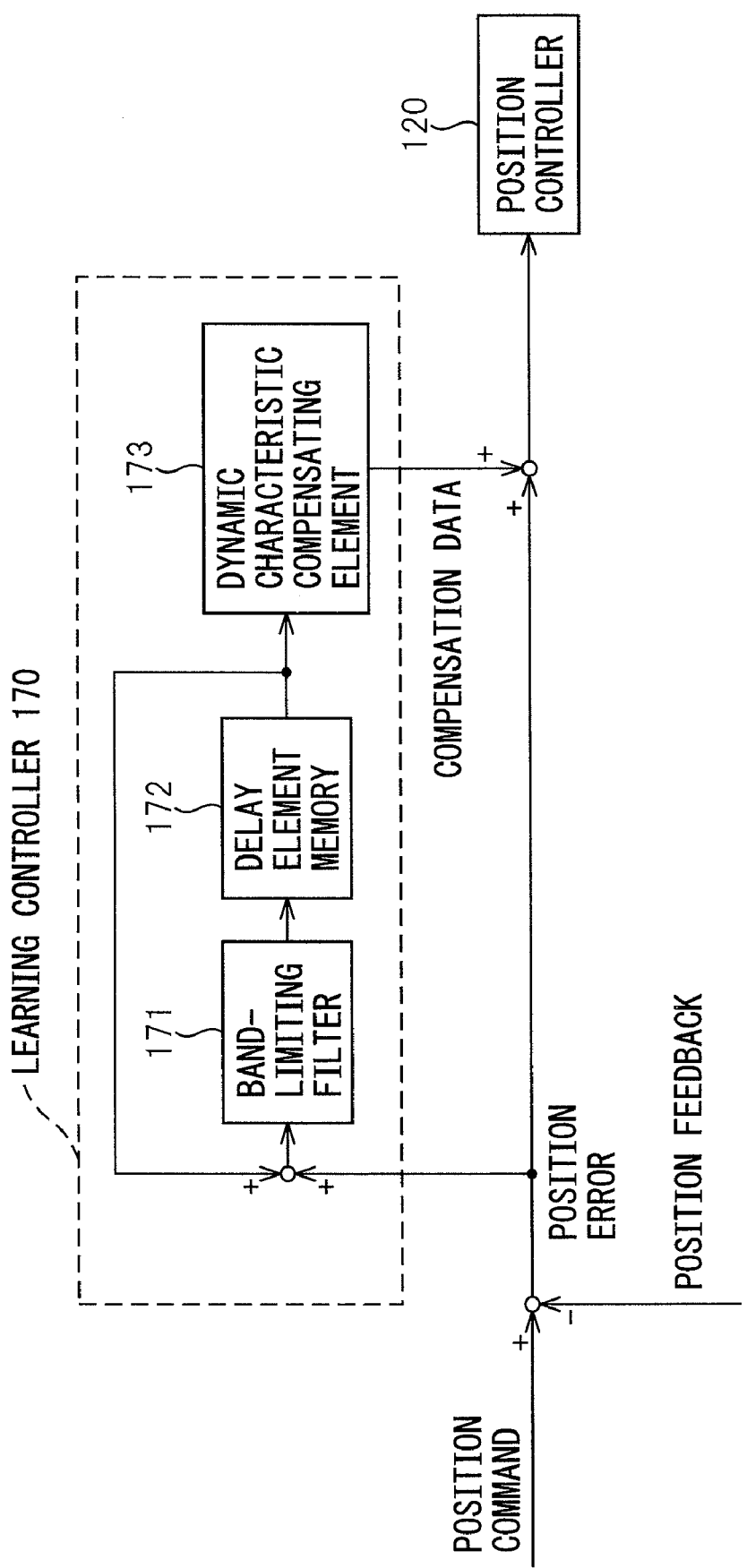
FIG. 4 is a block diagram showing an embodiment of a learning controller according to the present invention.

In each position control cycle, the learning controller 170 adds the supplied position error to the amount of compensation obtained one cycle back in a repeated pattern, processes the sum through a band-limiting filter 171 for limiting the input of high frequencies, and stores the result in a delay element memory 172. The delay element memory 172 includes a memory element for storing the amount of compensation for one cycle of the repeated pattern; in each position control cycle, the delay element memory 172 outputs the amount of compensation obtained in the previous position control cycle, i.e., one cycle back in the repeated pattern, and a dynamic characteristic compensating element 173 creates the compensation data which compensates for the phase lag and gain drop of the control target (FIG. 4).

The adder 138 calculates the position error as an input signal to the position controller 120 by adding the compensation data created by the learning controller 170 to the dual-position error E3 (step 220). After that, the generation of the speed command by the position controller 120 (step 222), the generation of the current command by the speed controller 122 (step 224), and the generation of the amplifier driving command by the current controller 124 (step 226) are performed as earlier described.

In the above embodiment, in step 208, the time constant circuit 150 acting as a first-order lag element with a time constant τ applies processing to the semi/full error "E2−E1", as described above; therefore, using a transfer function, the output of the time constant circuit 150 can be expressed as:

Output of time constant circuit=$[1/(1+\tau s)]\times(E2-E1)$

Then, in the next step 210, the following calculation is performed.

Dual-position error $E3$=Motor position error $E1$+Output of time constant circuit Accordingly, if the time constant τ is set at 0, the dual-position error E3 is output as shown by the following equation.

Dual-position error $E3$=Motor position error $E1$+Semi/full error $(E2-E1)$=Machine position error $E2$ On the other hand, if the time constant τ is set at ∞, the dual-position error E3 is output as shown by the following equation.

Dual-position error $E3$=Motor position error $E1$+"0"=Motor position error $E1$ That is, when the time constant τ=0, full-closed-loop control is performed, and when the time constant τ=∞, semi-closed-loop control is performed. In this way, by controlling the value of the time constant τ and varying the proportion between the full-closed-loop control and the semi-closed-loop control, it becomes possible to adjust the balance between the accuracy achieved by the full-closed-loop control and the stability achieved by the semi-closed-loop control.

Further, in the present embodiment, the selector 160 is provided which switches the input to the learning controller 170 between the machine position error E2 and the dual-position error E3. As described earlier, in the prior art, when performing the quadrant protrusion compensation by creating ideal quadrant protrusion compensation data through learning control and by storing the compensation data, if the learning control is performed using the position error of the motor, a problem occurs in that the quadrant protrusion on the machine side cannot be reduced though the quadrant protrusion on the motor side can be reduced. In contrast, according to the present embodiment, it is possible to first create compensation data for reducing the quadrant protrusion by learning the position error on the machine side and then perform the dual-position feedback control for the motion thereafter by increasing the gain. In this case, since the compensation data for reducing the quadrant protrusion by reducing the position error on the machine side is already created, the quadrant protrusion does not occur (FIGS. 5A and 5B).

Figure 6A:
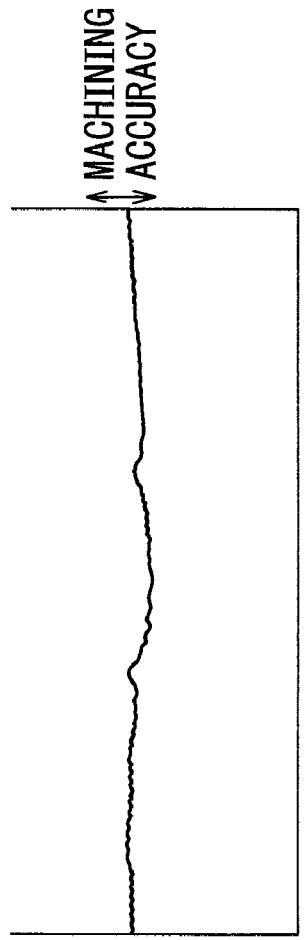
FIGS. 6A and 6B are diagrams showing an example 2 illustrating the effect of the invention by way of example.
Figure 6B:

Further, as earlier described, when performing the learning control by using the position error on the machine side, if the gain is reduced in order to allow the learning control to converge, a problem occurs in that machining accuracy degrades in the case of a machining operation that involves a large cutting reaction force. In contrast, according to the present embodiment, in the case of a coarse machining operation that involves a large cutting reaction force, a certain degree of accuracy can be maintained by performing the learning control by increasing the gain using the dual-position feedback control (FIGS. 6A and 6B), while in the case of a finishing operation in which the cutting reaction force is small, high accuracy can be achieved by switching the control scheme to the full-closed-loop control, reducing the gain, and then performing the learning control using the position error on the machine side.

In the case of machining where the gain cannot be increased in a specific machine position (for example, the position where the resonance point of a ballscrew becomes pronounced), the dual-position feedback control may be performed only on such a specific position; even in such cases, the input to the learning control can be switched accordingly. Based on a parameter, external signal, machine position, etc., the selector 60 switches the input to the learning control by considering these various conditions.

Figure 3:
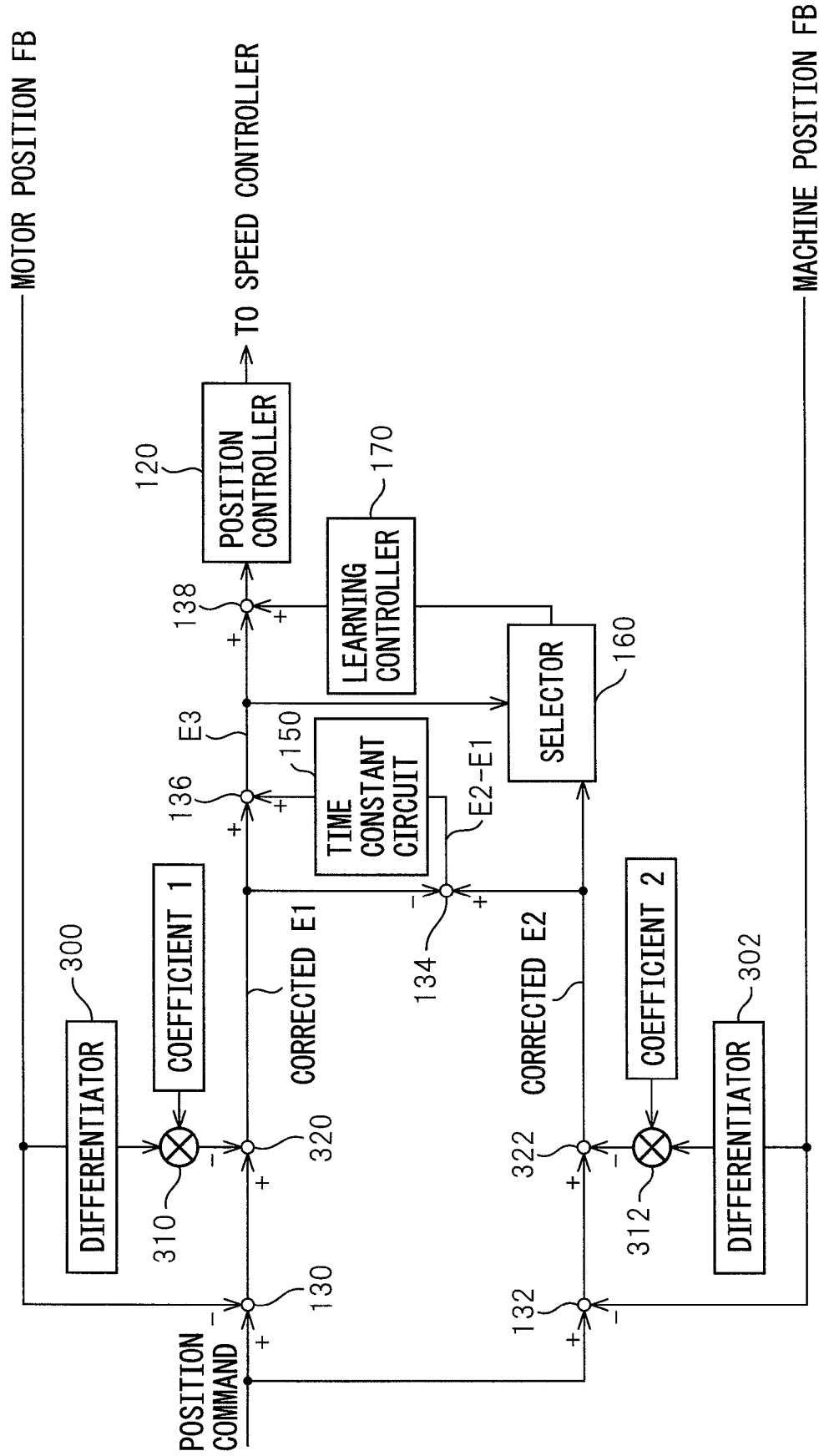
FIG. 3 is a block diagram showing another embodiment of a servo control apparatus according to the present invention.

FIG. 3 is a block diagram showing another embodiment of a servo control apparatus according to the present invention. The embodiment shown in FIG. 3 differs from the embodiment shown in FIG. 1 only by the inclusion of additional circuit blocks, one comprising a differentiating circuit 300, a multiplier 310, and an adder 320, and the other comprising a differentiating circuit 302, a multiplier 312, and an adder 322. Therefore, the motor 100, the machine 102, the motor position detector 110, the machine position detector 112, the speed controller 122, the current controller 124, and the servo amplifier 126 are omitted from illustration.

A finite time is required to transfer position data to the motor position detector 110 and the machine position detector 112. To compensate for such detection delays, the embodiment shown in FIG. 3 applies the amount of compensation proportional to speed to the position error thereby bringing the position error closer to the actual position error.

More specifically, the differentiating circuit 300 calculates the motor speed by differentiating the motor position feedback. The multiplier 310 obtains the amount of compensation by multiplying the motor speed by a predetermined coefficient. The adder 320 outputs the motor position error E1 after compensating for the transfer delay by subtracting the amount of compensation from the output of the adder 130.

Similarly, the differentiating circuit 302 calculates the machine speed by differentiating the machine position feedback. The multiplier 312 obtains the amount of compensation by multiplying the machine speed by a predetermined coefficient. The adder 322 outputs the machine position error E2 after compensating for the transfer delay by subtracting the amount of compensation from the output of the adder 132.

The invention may be embodied in other specific forms. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A servo control apparatus that performs dual-position feedback control, comprising:
    a first position detector for detecting position of a servo motor;
    a second position detector for detecting position of a load being driven by said servo motor;
    a first position error calculator for calculating a first position error based on a position command for said driven load and on position feedback from said first position detector;
    a second position error calculator for calculating a second position error based on said position command for said driven load and on position feedback from said second position detector;
    a third position error calculator for calculating a third position error to be used for position control, by adding to said first position error a difference taken between said first position error and said second position error and passed through a time constant circuit;
    a selector for selecting either said second position error or said third position error for output; and
    a learning controller for learning an amount of compensation necessary to bring said second position error close to zero when said second position error is output from said selector, and learning an amount of compensation necessary to bring said third position error close to zero when said third position error is output from said selector, and for outputting either one of said learned amounts of compensation as an amount of compensation to be applied to said third position error.

2. A servo control apparatus as claimed in claim 1, wherein said selector makes said selection, based on either an external signal or on the position of said driven load.

3. A servo control apparatus as claimed in claims 1 or 2, wherein when calculating said first position error, said first position error is compensated by applying an amount of compensation proportion to speed of said servo motor to compensate for a delay in detection by said first position detector, and when calculating said second position error, said second position error is compensated by applying an amount of compensation proportion to speed of said driven load to compensate for a delay in detection by said second position detector.

* * * * *